(12) United States Patent
Abdossalami et al.

(10) Patent No.: US 10,442,257 B2
(45) Date of Patent: Oct. 15, 2019

(54) DETERMINING TIRE LEAK RATE

(71) Applicant: GM Global Technology Operations LLC, Detroit, MI (US)

(72) Inventors: Amin Abdossalami, Toronto (CA); Joseph K. Moore, Whitby (CA); Liviu Serbu, Woodbridge (CA); Fahim Javid, Pickering (CA); Mansoor Alghooneh, North York (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 171 days.

(21) Appl. No.: 15/656,424

(22) Filed: Jul. 21, 2017

(65) Prior Publication Data
US 2019/0023089 A1    Jan. 24, 2019

(51) Int. Cl.
*B60C 23/04* (2006.01)
*B60C 23/06* (2006.01)
(Continued)

(52) U.S. Cl.
CPC .......... *B60C 23/0486* (2013.01); *B60C 23/06* (2013.01); *G01L 17/00* (2013.01); *G01L 19/0092* (2013.01); *G01M 3/26* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 7/02; G01M 99/00; G01M 99/002; G01M 1/12; G01M 1/225; G01M 3/04; G01M 3/40; G01M 5/0091; H01L 2924/00; H01L 2224/48247; H01L 2224/73265; H01L 2224/97; H01L 2924/00012; H01L 2224/32145; H01L 2224/32245; H01L 2924/00014; H01L 2224/2919; H01L 2924/0002; H01L 2924/12044; H01L 2924/13091; H01L 2924/14;
(Continued)

(56) References Cited

U.S. PATENT DOCUMENTS

| | | | | |
|---|---|---|---|---|
| 5,473,938 A | * | 12/1995 | Handfield | B60C 23/0401 73/146.5 |
| 2001/0008083 A1 | * | 7/2001 | Brown | B60C 23/0408 73/146 |

(Continued)

*Primary Examiner* — Andre J Allen
(74) *Attorney, Agent, or Firm* — Cantor Colburn LLP

(57) ABSTRACT

Examples of techniques for determining tire leak rate are disclosed. In one example implementation, a method includes receiving, by a processing device, temperature data, pressure data, tire characteristics, and an estimated leak rate associated with the tire. The method further includes calculating, by the processing device, a temperature normalized fused pressure after fusing the temperature data and the pressure data. The method further includes determining, by the processing device, the tire leak rate based at least in part on a decay of the temperature normalized fused pressure over time. The method further includes providing, by the processing device, an alert to an operator of the vehicle that a leak is detected based at least in part on a comparison between the tire leak rate and a leak rate threshold.

20 Claims, 6 Drawing Sheets

(51) Int. Cl.
*G01L 19/00* (2006.01)
*G01L 17/00* (2006.01)
*G01M 3/26* (2006.01)

(58) Field of Classification Search
CPC ... H01L 2924/1461; H01L 2924/15788; H01L 2924/181; H01L 2224/05599; H01L 2224/45099; H01L 2224/83; H01L 2224/85; H01L 2924/0665; H01L 21/02118; H01L 21/02175; H01L 21/02183; H01L 21/02186; H01L 21/02189; H01L 21/54; H01L 21/561; H01L 2224/05554; H01L 2224/48149; H01L 2224/49174; H01L 23/49575; H01L 2224/4941; H01L 23/04; H01L 23/3107; H01L 23/49551; H01L 24/09; H01L 24/48; H01L 24/49; H01L 24/73; H01L 24/93; H01L 24/97; H01L 25/03; H01L 25/50; H01L 27/20; H01L 2924/16151; H01L 35/34; H01L 41/25; H01L 41/311; H01L 41/313; B60C 23/0494; B60C 23/04; B60C 23/0493; B60C 2019/004; B60C 19/00; B60C 23/0498; B60C 23/064; B60C 23/0488; B60C 23/0496; B60C 23/0408; B60C 23/041; B60C 23/0411; B60C 23/20; B60C 11/243; B60C 11/246; B60C 23/06; B60C 23/061; B60C 23/00; B60C 23/0486; B60C 11/0083; B60C 13/003; B60C 2009/2038; B60C 23/003; B60C 23/004; B60C 23/02; B60C 23/0401; B60C 23/0406; B60C 23/0416; B60C 23/0433; B60C 23/0455; B60C 23/0489; B60C 25/007; B60C 23/0491; B60C 25/002; B60C 25/005; B60C 29/02; B60C 3/04; B60C 99/00; B60C 99/006; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28; G01L 17/00; G01L 17/005; G01L 19/0645; G01L 19/147; G01L 1/16; G01L 1/18; G01L 7/187; G01L 9/008; G01L 9/0098
USPC .................................................. 73/146–146.8
See application file for complete search history.

(56) References Cited

U.S. PATENT DOCUMENTS

| | | | |
|---|---|---|---|
| 2004/0017289 A1* | 1/2004 | Brown, Jr. | B60C 23/0408 340/442 |
| 2008/0216567 A1* | 9/2008 | Breed | B60C 11/24 73/146.5 |
| 2008/0284575 A1* | 11/2008 | Breed | B60C 23/0493 340/438 |

* cited by examiner

DETERMINING TIRE LEAK RATE

INTRODUCTION

The present disclosure relates generally to tire leak detection and more particularly to determining a tire leak rate.

A vehicle, such as a car, motorcycle, or any other type of automobile may be equipped with tires to enable the vehicle to be mobile. Tires are frequently filled with gas. If the tire is penetrated by a foreign object or the integrity of the tire is otherwise compromised, the gas can escape the tire, causing the tire to deflate. In the case of a slower leak, the vehicle's efficiency can be compromised, while in the case of a faster leak, the vehicle's safety can also be compromised.

SUMMARY

Examples of techniques for determining tire leak rate are disclosed. In one example embodiment, a method includes receiving, by a processing device, temperature data, pressure data, tire characteristics, and an estimated leak rate associated with the tire. The method further includes calculating, by the processing device, a temperature normalized fused pressure after fusing the temperature data and the pressure data. The method further includes determining, by the processing device, the tire leak rate based at least in part on a decay of the temperature normalized fused pressure over time. The method further includes providing, by the processing device, an alert to an operator of the vehicle that a leak is detected based at least in part on a comparison between the tire leak rate and a leak rate threshold.

In another example embodiment, a system for determining tire leak rate of a tire of a vehicle includes a memory comprising computer readable instructions and a processing device for executing the computer readable instructions for performing a method. The method includes receiving, by a processing device, temperature data, pressure data, tire characteristics, and an estimated leak rate associated with the tire. The method further includes calculating, by the processing device, a temperature normalized fused pressure after fusing the temperature data and the pressure data. The method further includes determining, by the processing device, the tire leak rate based at least in part on a decay of the temperature normalized fused pressure over time. The method further includes providing, by the processing device, an alert to an operator of the vehicle that a leak is detected based at least in part on a comparison between the tire leak rate and a leak rate threshold.

In another example embodiment, computer program product for determining tire leak rate of a tire of a vehicle includes a computer readable storage medium having program instructions embodied therewith, wherein the computer readable storage medium is not a transitory signal per se, the program instructions executable by a processing device to cause the processing device to perform a method. The method includes receiving, by a processing device, temperature data, pressure data, tire characteristics, and an estimated leak rate associated with the tire. The method further includes calculating, by the processing device, a temperature normalized fused pressure after fusing the temperature data and the pressure data. The method further includes determining, by the processing device, the tire leak rate based at least in part on a decay of the temperature normalized fused pressure over time. The method further includes providing, by the processing device, an alert to an operator of the vehicle that a leak is detected based at least in part on a comparison between the tire leak rate and a leak rate threshold.

In one or more embodiments, the alert indicates that the leak is classified as a limp home leak. In one or more embodiments, the leak is classified as a limp home leak when the tire leak rate is greater than a limp home leak rate threshold and less than a limp aside leak rate threshold. In one or more embodiments, the alert indicates that the leak is classified as a limp aside leak. In one or more embodiments, the leak is classified as a limp aside leak when the tire leak rate is greater than or equal to a limp aside leak rate threshold. In one or more embodiments, the temperature data is received from a temperature sensor associated with the tire, and wherein the pressure data is received from a pressure sensor associated with the tire. In one or more embodiments, calculating the temperature normalized fused pressure is performed using a data fusion technique, wherein the data fusion technique is one of an Extended Kalman Filter and a particle filter. In one or more embodiments, the method further includes receiving, by the processing device, wheel speed data for the tire; comparing, by the processing device, a ratio between the wheel speed data and other wheel speed data for other tires of the vehicle; and refining, by the processing device, the tire leak rate based at least in part on comparing the ratio between the wheel speed data and the other wheel speed data for other tires of the vehicle. In one or more embodiments, the method further includes estimating, by the processing device, a remaining time before the tire becomes unusable based at least in part on the tire leak rate. In one or more embodiments, the method further includes estimating, by the processing device, a remaining distance before the tire becomes unusable based at least in part on the tire leak rate. In one or more embodiments, the method further includes refining, by the processing device, the tire leak rate based at least in part on a rate of change of altitude.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
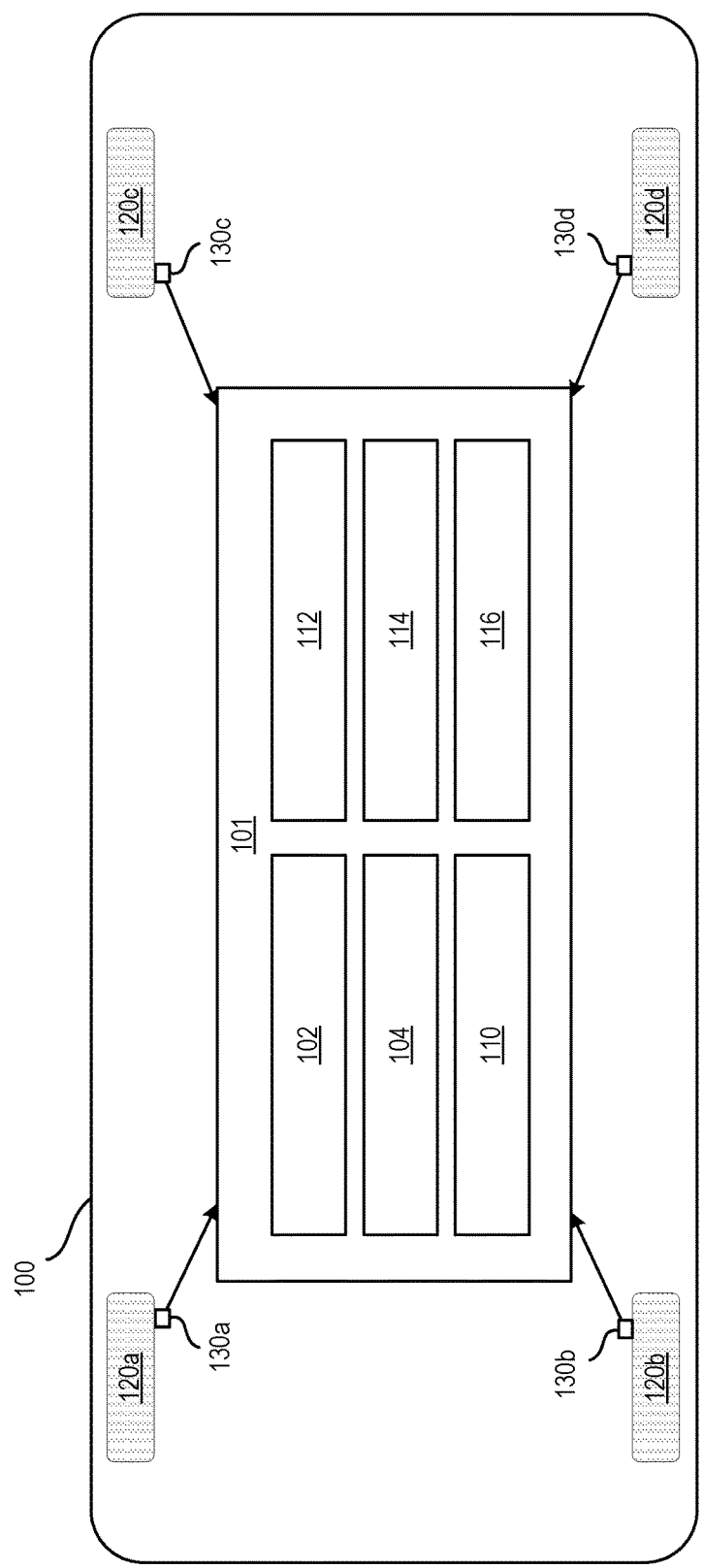
FIG. 1 depicts a block diagram of a vehicle including a processing system for determining tire leak rate, according to embodiments of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for determining tire leak rate using pressure and temperature data. Traditional tire leak detection observes a pressure of a tire and determines whether the tire pressure exceeds a threshold. For example, if a tire has an observed pressure of 35 pounds per square inch (psi), and a tire pressure threshold is set to 27 psi, existing systems may indicate that the tire has a low tire pressure condition only when the pressure drops below the threshold (e.g., when the observed pressure drops below 27 psi). Existing systems do not comprehend tire leak rate when determining the state of the tire.

The present techniques determine a tire leak rate by fusing temperature and pressure data to generate a more accurate and noise-robust estimate of temperature normalized fused pressure of a tire than existing approaches. For example, by determining the tire leak rate, the severity of the leak can be determined so that an operator (i.e., driver) of the vehicle can take appropriate action. In the case of a slower tire leak rate, the vehicle can "limp home." That is, once a rate of leak passes a certain threshold, the operator is alerted and is provided with an estimated distance/time that the tire can operate until it becomes unusable (e.g., before the tire is deflated). In the case of a faster tire leak rate, the vehicle can "limp aside." That is, at a higher leak rate, the operator is alerted to maneuver the vehicle to a safe location immediately before the tire becomes unusable (e.g., before a blow-out occurs).

Tire leak rate can be determined to, for example, provide the operator with information useful to increase ride comfort, maneuverability, safety, efficiency, and other properties of the vehicle.

FIG. 1 depicts a vehicle 100 including a processing system 101 for determining tire leak rate according to embodiments of the present disclosure. The vehicle 100 also includes tires 120a, 120b, 120c, 120d (collectively "tires 120") each having a sensor 130a, 130b, 130c, 130d (collectively "sensors 130") respectively associated therewith. The sensors 130 are configured to send data (e.g., temperature data, pressure data, etc.) about the tires 120 to the processing system 101 of the vehicle 100. The sensor 130 can be a smart sensor that includes a processor and a memory so that pressure and temperature data can be processed prior to transmitting to the processing system 101.

The processing system 101 includes a processing device 102, a memory 104, a sensor engine 110, a fusion engine 112, a leak rate determination engine 114, and an alert engine 116. The processing system 101 receives data about the tires 120 (e.g., tire speed data), and uses the data to determine tire leak rate as described herein.

The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these.

In examples, the module(s) described herein may be a combination of hardware and programming. The programming may be processor executable instructions stored on a tangible memory, and the hardware may include the processing device 102 for executing those instructions. Thus a system memory (e.g., the memory 104) can store program instructions that when executed by the processing device 102 implement the engines described herein. Other modules may also be utilized to include other features and functionality described in other examples herein. Alternatively or additionally, the processing system 101 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 2:
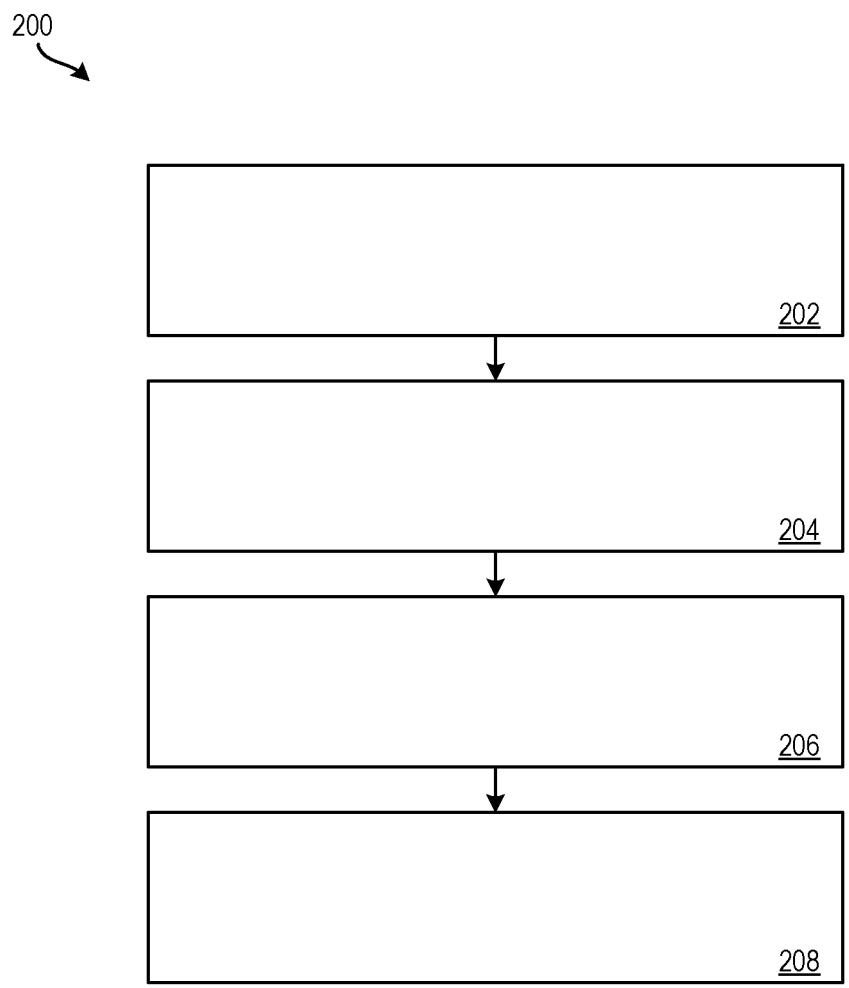
FIG. 2 depicts a flow diagram of a method for determining tire leak rate, according to aspects of the present disclosure.

FIG. 2 depicts a flow diagram of a method 200 for determining tire leak rate, according to aspects of the present disclosure. The method 200 may be implemented, for example, by the processing system 101 of FIG. 1, by the processing system 600 of FIG. 6, or by another suitable processing system or device. According to one or more embodiments of the present disclosure, the method 200 can be implemented by a smart sensor, such as the sensor 130. In describing the method 200, reference is made to tire 120a and sensor 130a; however, it should be appreciated that the techniques can apply to any one or more of the tires 120 and sensors 130.

At block 202, the sensor engine 110 receives temperature data and pressure data associated with the tire 120a. The temperature data and the pressure data is received from the sensor 130a associated with tire 120a. According to some embodiments, the sensor 130a can be a group or array of sensors that collect data about the tire 120a. For example, the sensors 130a can include temperature sensors, pressure sensors, and other suitable sensors that collect data about the tire 120a. Accordingly, the sensor engine 110 can receive temperature data from a temperature sensor and pressure data from a pressure sensor.

At block 204, the fusion engine 112 calculates a temperature normalized fused pressure after fusing the temperature data and the pressure data. Fusion of temperature and pressure reduces signal noise due to sensor quantization, model uncertainty, tire characteristics, estimated leak rate, and sensor noise. A Kalman Filter (e.g., an Extended Kalman Filter), a Particle filter, and/or other adaptive filters or observers can be used to perform the fusion. According to an embodiment of the invention, an Extended Kalman Filter can be applied as a linearized recursive algorithm to perform the fusion to calculate the temperature normalized fused pressure. The Extended Kalman Filter is a computationally efficient approach for fusion. For example, an Extended Kalman Filter state transition process and state update process can be derived using the following equation:

$$x_{k+1} = x_k + \text{Impact of Temperature Change} + \text{Impact of Leak} + w_k$$

$$x_{k+1} = x_k + \frac{dT}{dt} * \frac{n_k R}{V_k} - x_k e^{\frac{-t_{sample}}{\tau}} + w_k = x_k(1 - K_1(k)) + K_2(k)u + w_k$$

$$P_k = x_k + v_k$$

According to the foregoing equation, the variables are defined as follows. $P_k$ is the pressure of the tire gas of the tire 120a measured by the sensor 130a at time k. $x_k$ is the fused pressure of the tire gas of the tire 120a estimated by the Kalman filter at time k. V is the volume of the tire cavity of the tire 120a. $n_k$ is the amount of substance of gas (in moles) at time k updated based on the leak estimation algorithm. R is the ideal (or universal) gas constant equal to the product of the Boltsmann constant and the Avogadro constant. T is the temperature of the tire air of the tire 120a derived at time k. Its derivative at time k is used in the filter as input $$u_k = \frac{dT}{dt}\bigg|_{t=k}.$$

The variable $w_k$ is the state transition noise/uncertainty which is assumed to be zero mean Gaussian white noise with covariance $Q_k$. The variable $v_k$ is the measurement noise/uncertainty which is assumed to be zero mean Gaussian white noise with covariance $R_k$. $K_1(k)$ contains linearized leak information at time k. $K_2(k)$ maps the mapping of temperature variations to pressure variation at time k. It can be estimated using an event-based update algorithm. Assuming the cavity volume change is insignificant, this parameter should be dominantly changed with $n_k$.

The temperature normalized fused pressure ($P_N$) can be derived from the fused pressure using the following equation where $T_{ref}$ and T denote a reference temperature and the sensor temperature, respectively:

$$P_N = x_k \frac{T_{ref}}{T}$$

At block 206, the leak rate determination engine 114 determines the tire leak rate based at least in part on a decay of the temperature normalized fused pressure over time. The decay of the temperature normalized fused pressure over time is calculated using a regression model. In one embodiment, decay of the temperature normalized fused pressure over time is calculated using an exponential decay model and filtered tire pressure estimate from the fusion and temperature normalization performed at block 204. In the case of a faster than normal leakage, and assuming the leak and temperature are the dominant factors that change the tire pressure, then the decay of the temperature-normalized tire pressure (temperature normalized fused pressure from block 204) can be estimated using the following equation:

$$P_N(t) = P_0 e^{kt}$$

According to the foregoing equation, the variables are defined as follows. $P_0$ is the pressure (or temperature normalized fused pressure) at the start of leak (i.e., $P_N(0)$). The decay factor k is related to the decay time constant $\tau$ with $$k = -\frac{1}{\tau}.$$

The propagation of error/uncertainty/standard deviation in estimating both temperature normalized fused pressure and decay factor can propagate through the decay equation in time t as follows below where $\delta_{P_0}$ is the initial temperature normalized fused pressure standard deviation and where $\delta_k$ is the decay factor standard deviation. The equation shows that the slower the leak, the larger the uncertainty in estimated time to reach minimum acceptable pressure.

$$\delta_{P_N(t)} = \sqrt{\left(\frac{\sigma_{P_N(t)}}{\sigma_{P_0}}\delta_{P_0}\right)^2 + \left(\frac{\sigma_{P_N(t)}}{\sigma_K}\delta_K\right)^2} = P_0 e^{kt}\sqrt{\left(\frac{1}{P_0}\delta_{P_0}\right)^2 + (t\delta_K)^2}$$

Accordingly, it is useful for the pressure observer (e.g., the operator of the vehicle 100) to minimize the level of uncertainty/standard deviation in estimating the temperature normalized fused pressure and pressure decay factor.

In another embodiment, the rate of change of the temperature normalized tire pressure can also be derived using the following equation in continuous time domain:

$$\frac{dP_N}{dt} = \frac{dP_f}{dt} - \frac{nR}{V}\frac{dT}{dt}$$

where, $P_f$ is a filtered pressure of the tire gas, and n is the amount of substance of gas (in moles) in continuous time domain. In this case, the temperature normalized tire pressure can be demonstrated to have parabolic decay in case of a leak when the leak air speed is at sonic level and the leak process is isentropic. In such a scenario, the decay of the temperature-normalized tire pressure (from block 204) can be estimated using the following equation:

$$P_N(t) = [kt + P_0^{1/\gamma}]^\gamma$$

According to the foregoing equation, the variables are defined as follows. $P_0$ is the pressure (or filtered pressure) at the start of leak (i.e., $P_N(0)$). The decay factor k is related to the mass flow of the leaking air and $$\gamma = \frac{c_p}{c_v}$$

is the ratio of $c_p$ to $c_v$, specific heat at constant pressure and specific heat at constant volume, respectively.

In this embodiment, at block 206, the leak rate determination engine 114 determines the tire leak rate based at least in part on the estimation of the puncture size of the tire. One approach is to assume the leak is an isentropic process, based on which the following formula describes how to estimate the puncture size:

$$A = \left(\frac{P_{atm}}{V}\left(\frac{P_{atm}}{x}\right)^{\frac{1-\gamma}{\gamma}}\sqrt{2c_p T\left(1 - \frac{P_{atm}}{x}^{\frac{\gamma-1}{\gamma}}\right)}\right)^{-1}\left(\frac{dP_f}{dt} - \frac{nR}{V}\frac{dT}{dt}\right)$$

where A is the estimated puncture size and $P_{atm}$ is the atmospheric air pressure. The variable n, which indicates the amount of substance of gas (in moles) in continuous time domain, can be updated using the following equation:

$$\frac{dn}{dt} = -\frac{P_{atm}}{RT}\left(\frac{P_{atm}}{P_f}\right)^{\frac{1-\gamma}{\gamma}}\sqrt{2c_p T\left(1 - \frac{P_{atm}}{P_f}^{\frac{\gamma-1}{\gamma}}\right)} A$$

At block 208, the alert engine 116 provides an alert to an operator of the vehicle 100 that a leak is detected based at least in part on a comparison between the tire leak rate and leak rate thresholds. The leak can be classified depending on the rate of the leak. For example, a slower leak can be classified as a "limp home" leak, which is a leak that has a relatively slow leak rate, indicating that the tire can continue to operate. In this way, the vehicle 100 can travel to a safe location, such as the operator's home, a service/repair center, or another suitable location. In another example, a faster leak can be classified as a "limp aside" leak, which is a leak that has a relatively fast leak, indicating that the tire cannot continue to operate and that a blowout is imminent. In such cases, the operator should move the vehicle to a safe location (e.g., a shoulder of the road, a side road, etc.) as quickly as possible.

Leak rate thresholds can in part help to delineate between normal conditions, a limp home leak and a limp aside leak. For example, if a leak rate exceeds the limp aside leak rate threshold, the leak is considered a limp aside leak. However, if the leak rate exceeds the limp home leak rate, but not the limp aside leak rate, the leak is considered a limp home leak.

Additional processes also may be included, and it should be understood that the processes depicted in FIG. 2 represent illustrations and that other processes may be added or existing processes may be removed, modified, or rearranged without departing from the scope and spirit of the present disclosure.

Figure 3:
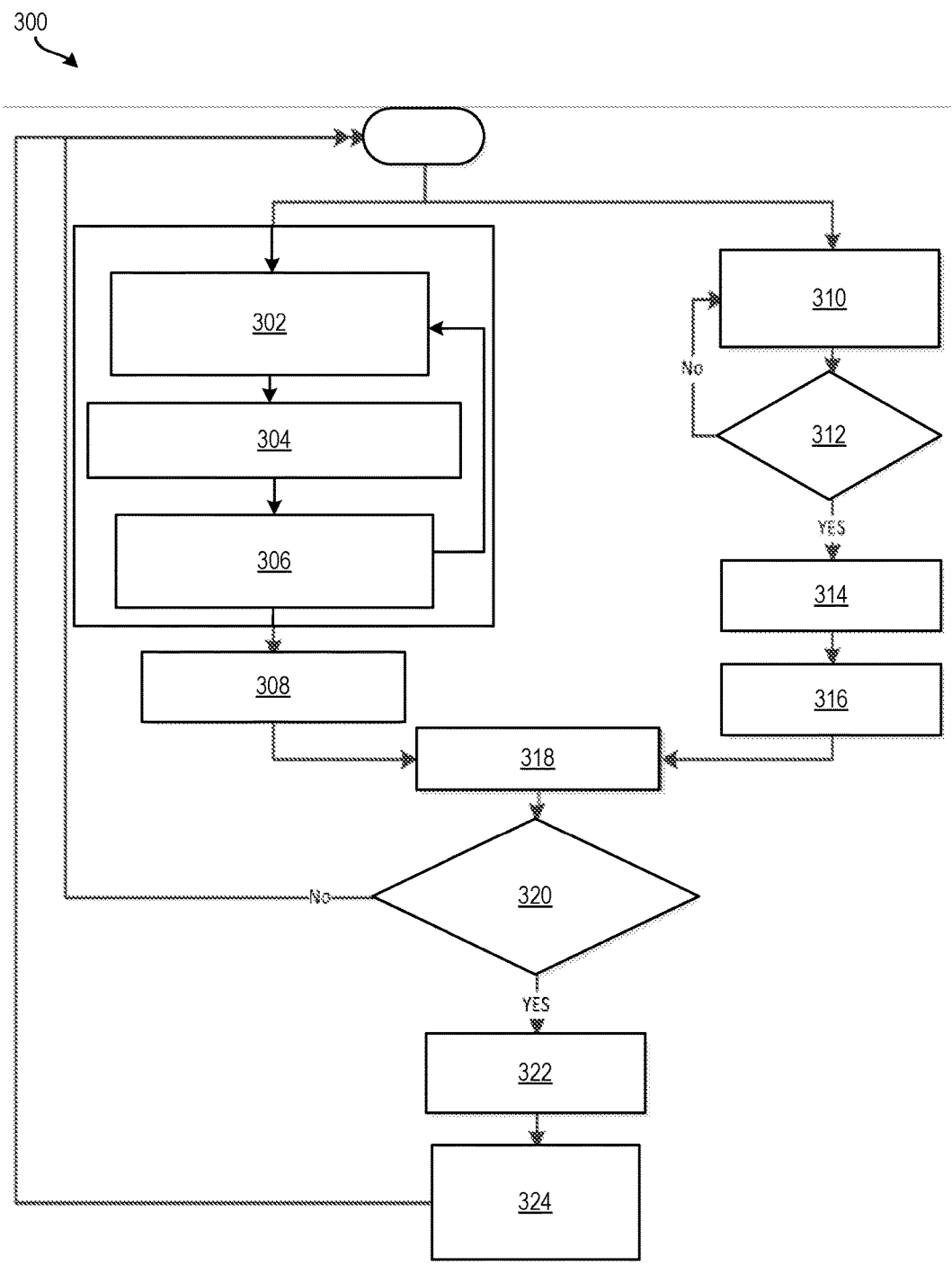
FIG. 3 depicts a flow diagram of a method for determining tire leak rate, according to aspects of the present disclosure.

FIG. 3 depicts a flow diagram of a method 300 for determining tire leak rate, according to aspects of the present disclosure. The method 300 may be implemented, for example, by the processing system 101 of FIG. 1, by the processing system 600 of FIG. 6, or by another suitable processing system or device.

At block 302, pressure data and temperature data are fused. In some embodiments, tire characteristics can also be fused with the pressure data and temperature data at block 302. In some embodiments, the estimated leak rate (from block 306) can also be fused with the pressure data and temperature data at block 302. At block 304, temperature normalized fused tire pressure is calculated. At block 306, a leak rate is estimated based on a leak model and temperature normalized fused pressure calculated at block 304. At block 308, rate of change of altitude can be used to correct the leak rate (e.g., the leak rate may be adjusted up or down when the atmospheric pressure is decreasing or increasing, respectively).

Concurrently, at block 310, enabling criteria such as low slip conditions are assessed. If no enabling criteria are met at decision block 312, the method 300 returns to block 310. If enabling criteria are met at decision block 312, wheel speed sensor data is compared between the wheels at block 314. For example, the ratio of the wheel speed data is compared between front/back wheel pairs of the vehicle and/or between left/right wheel pairs of the vehicle. The wheel speed data is received form a wheel speed sensor, which can be integrated into sensors 130 or another suitable sensor, or can be a separate sensor for each tire 120. At block 316, an estimated leak rate is computed based on the time history of the wheel speed sensor data and comparison at step 314.

At block 318, the results of the altitude corrected leak rate (from block 308) and the estimated leak rate from the wheel speed sensor data (from block 316) are fused into a leak estimator. At block 320, it is determined whether the tire leak rate is a limp home rate or a limp aside rate, such as by comparing the tire leak rate to leak rate thresholds. If it is determined that the tire leak rate is not in the range of a limp home or limp aside at decision block 320, the method 300 repeats. However, if it is determined that the tire leak rate is in the range of a limp home or limp aside at decision block 320, an estimate time and/or distance remaining until the tire becomes unusable (e.g., flat, blowout, etc.) is estimated at block 322. At block 324, an alert, the tire leak rate, and/or the remaining time and/or distance is reported to an operator of the vehicle 100. The method 300 can then repeat.

Additional processes also may be included, and it should be understood that the processes depicted in FIG. 3 represent illustrations and that other processes may be added or existing processes may be removed, modified, or rearranged without departing from the scope and spirit of the present disclosure.

Figure 4:
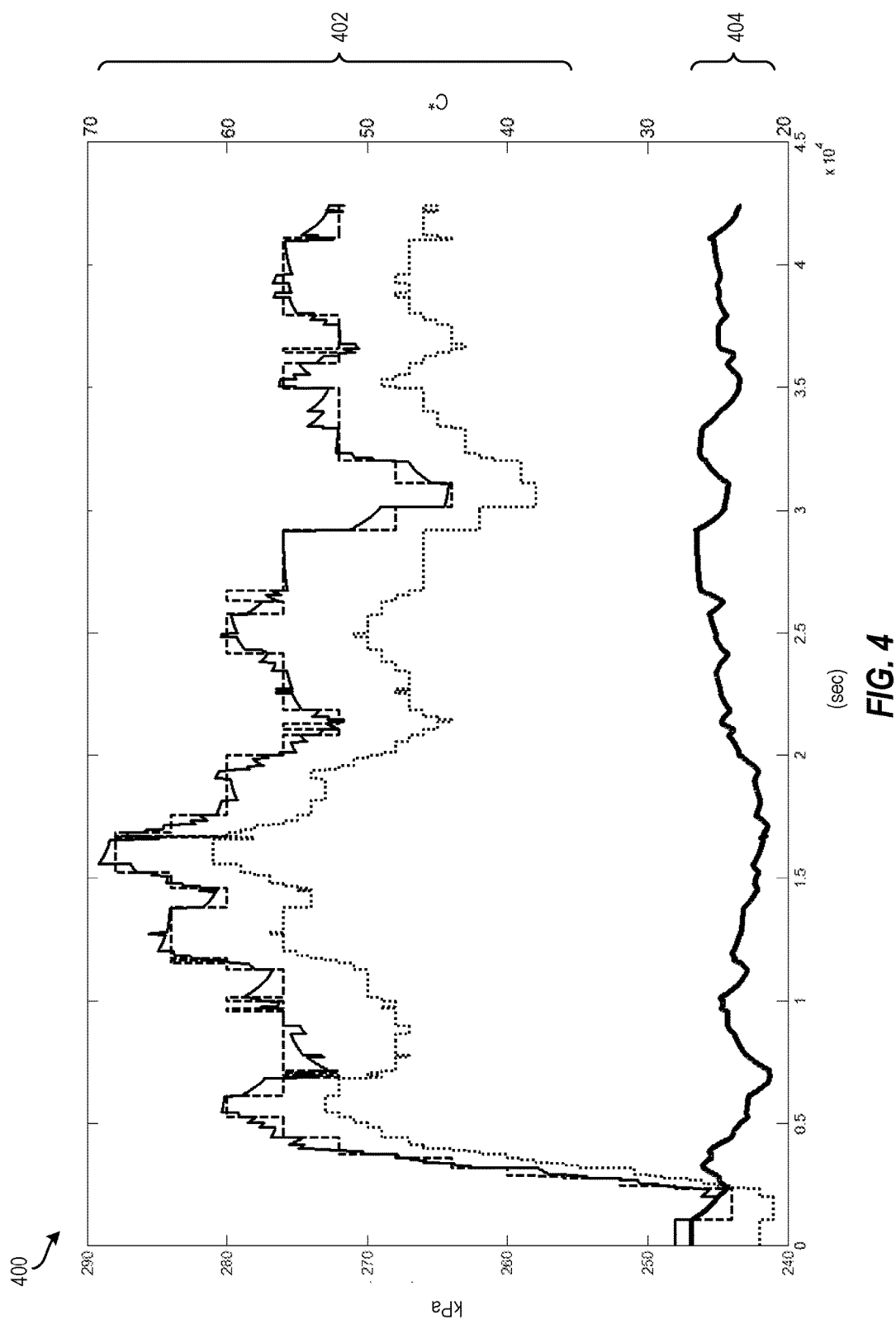
FIG. 4 depicts a graph of the results of applying fusion when determining tire leak rate, according to aspects of the present disclosure.

FIG. 4 depicts a graph 400 of the results of applying fusion when determining temperature normalized fused pressure, according to aspects of the present disclosure. The graph 400 part 402, dashed line, plots sensed tire pressure over time. The graph 400 part 402, dotted line, plots sensed tire temperature over time. The graph 400 part 402, solid line, plots fused pressure over time. The graph 400 part 404, solid thick line, plots temperature normalized fused pressure over time. In particular, the graph 400 compares the sensed pressure, the fused pressure and the temperature normalized fused pressure over time. As shown, the temperature normalized fused pressure illustrates a more steady behavior with significantly less fluctuation compared to sensed and fused pressure. The steady behavior of the temperature normalized fused pressure enables the next step that is to detect leak rate.

Figure 5:
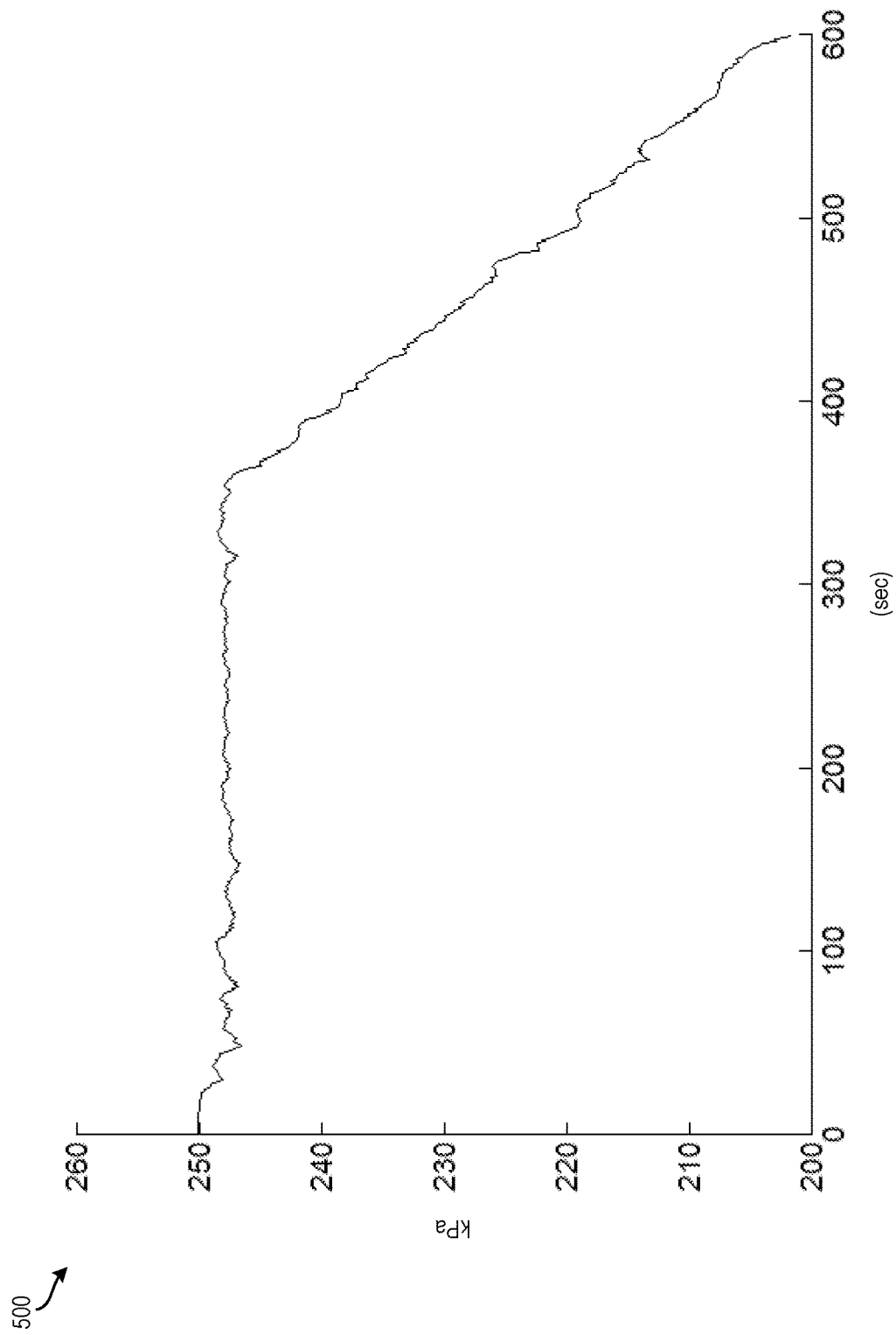
FIG. 5 depicts a graph of the temperature normalized fused pressure during the initiation of a tire leak, according to aspects of the present disclosure.

FIG. 5 depicts a graph 600 of the temperature normalized fused pressure during the initiation of a tire leak. Utilizing the temperature normalized fused pressure, the tire leak rate may be calculated as described herein.

Figure 6:
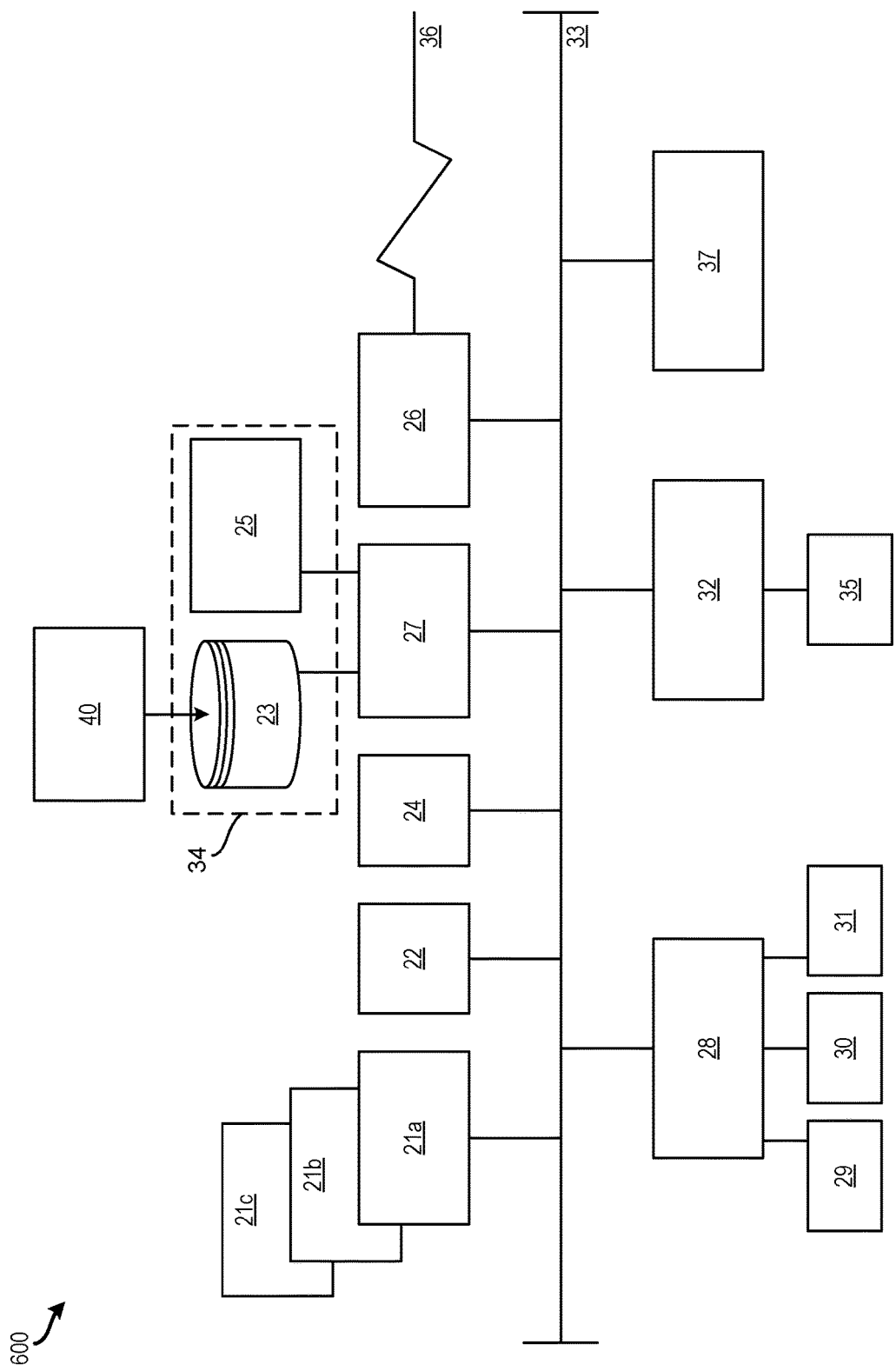
FIG. 6 depicts a block diagram of a processing system for implementing the techniques described herein, according to aspects of the present disclosure.

It is understood that the present disclosure is capable of being implemented in conjunction with any other type of computing environment now known or later developed. For example, FIG. 6 illustrates a block diagram of a processing system 600 for implementing the techniques described herein. In examples, processing system 600 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 600.

Further illustrated are an input/output (I/O) adapter 27 and a network adapter 26 coupled to system bus 33. I/O adapter 27 may be a small computer system interface (SCSI) adapter that communicates with a hard disk 23 and/or another storage drive 25 or any other similar component. I/O adapter 27, hard disk 23, and storage device 25 are collectively referred to herein as mass storage 34. Operating system 40 for execution on processing system 600 may be stored in mass storage 34. A network adapter 26 interconnects system bus 33 with an outside network 36 enabling processing system 600 to communicate with other such systems.

A display (e.g., a display monitor) 35 is connected to system bus 33 by display adapter 32, which may include a graphics adapter to improve the performance of graphics intensive applications and a video controller. In one aspect of the present disclosure, adapters 26, 27, and/or 32 may be connected to one or more I/O buses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 600 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 600.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for determining tire leak rate of a tire of a vehicle, the method comprising:
   receiving, by a processing device, temperature data, pressure data, tire characteristics, and an estimated leak rate associated with the tire;
   calculating, by the processing device, a temperature normalized fused pressure after fusing the temperature data and the pressure data;
   determining, by the processing device, the tire leak rate based at least in part on a decay of the temperature normalized fused pressure over time; and
   providing, by the processing device, an alert to an operator of the vehicle that a leak is detected based at least in part on a comparison between the tire leak rate and a leak rate threshold.

2. The computer-implemented method of claim 1, wherein the alert indicates that the leak is classified as a limp home leak.

3. The computer-implemented method of claim 2, wherein the leak is classified as a limp home leak when the tire leak rate is greater than a limp home leak rate threshold and less than a limp aside leak rate threshold.

4. The computer-implemented method of claim 1, wherein the alert indicates that the leak is classified as a limp aside leak.

5. The computer-implemented method of claim 4, wherein the leak is classified as a limp aside leak when the tire leak rate is greater than or equal to a limp aside leak rate threshold.

6. The computer-implemented method of claim 1, wherein the temperature data is received from a temperature sensor associated with the tire, and wherein the pressure data is received from a pressure sensor associated with the tire.

7. The computer-implemented method of claim 1, wherein calculating the temperature normalized fused pressure is performed using a data fusion technique, wherein the data fusion technique is one of an Extended Kalman Filter and a particle filter.

8. The computer-implemented method of claim 1, further comprising:
   receiving, by the processing device, wheel speed data for the tire;
   comparing, by the processing device, a ratio between the wheel speed data and other wheel speed data for other tires of the vehicle; and
   refining, by the processing device, the tire leak rate based at least in part on comparing the ratio between the wheel speed data and the other wheel speed data for other tires of the vehicle.

9. The computer-implemented method of claim 1, further comprising:
   estimating, by the processing device, a remaining time before the tire becomes unusable based at least in part on the tire leak rate.

10. The computer-implemented method of claim 1, further comprising:
    estimating, by the processing device, a remaining distance before the tire becomes unusable based at least in part on the tire leak rate.

11. The computer-implemented method of claim 1, further comprising:
    refining, by the processing device, the tire leak rate based at least in part on a rate of change of altitude.

12. A system for determining tire leak rate of a tire of a vehicle, the system comprising:
    a memory comprising computer readable instructions; and
    a processing device for executing the computer readable instructions for performing a method, the method comprising:
      receiving, by the processing device, temperature data, pressure data, tire characteristics, and an estimated leak rate associated with the tire;
      calculating, by the processing device, a temperature normalized fused pressure after fusing the temperature data and the pressure data;
      determining, by the processing device, the tire leak rate based at least in part on a decay of the temperature normalized fused pressure over time; and
      providing, by the processing device, an alert to an operator of the vehicle that a leak is detected based at least in part on a comparison between the tire leak rate and a leak rate threshold.

13. The system of claim 12, wherein the alert indicates that the leak is classified as a limp home leak.

14. The system of claim 13, wherein the leak is classified as a limp home leak when the tire leak rate is greater than a limp home leak rate threshold and less than a limp aside leak rate threshold.

15. The system of claim 12, wherein the alert indicates that the leak is classified as a limp aside leak.

16. The system of claim 15, wherein the leak is classified as a limp aside leak when the tire leak rate is greater than or equal to a limp aside leak rate threshold.

17. A computer program product for determining tire leak rate of a tire of a vehicle, the computer program product comprising:
 a non-transitory computer readable storage medium having program instructions embodied therewith, the program instructions executable by a processing device to cause the processing device to perform a method comprising:
  receiving, by the processing device, temperature data, pressure data, tire characteristics, and an estimated leak rate associated with the tire;
  calculating, by the processing device, a temperature normalized fused pressure after fusing the temperature data and the pressure data;
  determining, by the processing device, the tire leak rate based at least in part on a decay of the temperature normalized fused pressure over time; and
  providing, by the processing device, an alert to an operator of the vehicle that a leak is detected based at least in part on a comparison between the tire leak rate and a leak rate threshold.

18. The computer program product of claim 17, wherein the alert indicates that the leak is classified as a limp home leak, and wherein the leak is classified as a limp home leak when the tire leak rate is greater than a limp home leak rate threshold and less than a limp aside leak rate threshold.

19. The computer program product of claim 17, wherein the alert indicates that the leak is classified as a limp aside leak, and wherein the leak is classified as a limp aside leak when the tire leak rate is greater than or equal to a limp aside leak rate threshold.

20. The computer program product of claim 17, wherein the temperature data is received from a temperature sensor associated with the tire, and wherein the pressure data is received from a pressure sensor associated with the tire.

* * * * *